US009244602B2

(12) United States Patent
Kwon et al.

(10) Patent No.: US 9,244,602 B2
(45) Date of Patent: Jan. 26, 2016

(54) MOBILE COMMUNICATIONS TERMINAL HAVING A TOUCH INPUT UNIT AND CONTROLLING METHOD THEREOF

(75) Inventors: Yong-Man Kwon, Seoul (KR); Yong-Sang Tak, Seoul (KR); Jin-Chul Kim, Seoul (KR); Dong-Seuck Ko, Gyeonggi-Do (KR); Hyung-Woon Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 1679 days.

(21) Appl. No.: 11/467,102

(22) Filed: Aug. 24, 2006

(65) Prior Publication Data

US 2007/0046646 A1    Mar. 1, 2007

(30) Foreign Application Priority Data

Aug. 24, 2005  (KR) .................... 20-2005-0024369 U
Oct. 25, 2005  (KR) ........................ 10-2005-0100547
Dec. 30, 2005  (KR) ........................ 10-2005-0136199

(51) Int. Cl.
G09G 5/00       (2006.01)
G06F 3/0485     (2013.01)
G06F 3/0354     (2013.01)
H04M 1/725      (2006.01)

(52) U.S. Cl.
CPC .......... *G06F 3/0485* (2013.01); *G06F 3/03547* (2013.01); *H04M 1/72583* (2013.01); *G06F 2203/0339* (2013.01); *H04M 2250/22* (2013.01)

(58) Field of Classification Search
CPC ..................... G06F 2203/0339; G06F 3/03547; G06F 3/0485; H04M 1/72583; H04M 2250/22
USPC .......... 345/173–174, 684, 156–157, 160, 184
See application file for complete search history.

(56) References Cited

U.S. PATENT DOCUMENTS

| 3,789,167 | A | 1/1974 | Seeger, Jr. et al. |
| 4,158,115 | A | 6/1979 | Parkinson et al. |
| 4,375,018 | A | 2/1983 | Petersen |
| 4,423,294 | A | 12/1983 | Walser et al. |
| 4,431,882 | A | 2/1984 | Frame |
| 4,433,223 | A | 2/1984 | Larson et al. |
| 4,567,354 | A | 1/1986 | Sekine |

(Continued)

FOREIGN PATENT DOCUMENTS

| JP | 2003298699 A | 10/2003 |
| JP | 2004-071223 | 4/2004 |
| WO | WO 03/060622 A2 | 7/2003 |

*Primary Examiner* — Quan-Zhen Wang
*Assistant Examiner* — Tony Davis
(74) *Attorney, Agent, or Firm* — Lee, Hong, Degerman, Kang & Waimey

(57) ABSTRACT

A method and apparatus for scrolling a display includes detecting contact relative to a touch pad having a plurality of regions which individually correspond to a plurality of different scrolling directions, and determining which region of the plurality of regions the contact is detected. If the contact is maintained for a first threshold time period, the method further includes scrolling an associated display in a direction corresponding to the previously determined region. Alternatively, scrolling a display includes receiving input responsive to contact relative to a plurality of regions of a touch pad, in which each of the plurality of regions individually correspond to a plurality of different scrolling directions, and scrolling an associated display in a direction corresponding to a scrolling direction associated with a last-contacted region of the plurality of regions.

10 Claims, 8 Drawing Sheets

(56) References Cited

U.S. PATENT DOCUMENTS

| | | |
|---|---|---|
| 5,847,336 A | 12/1998 | Thornton |
| 5,943,044 A * | 8/1999 | Martinelli et al. ............ 345/174 |
| 5,943,052 A * | 8/1999 | Allen et al. ................... 715/787 |
| 5,960,942 A | 10/1999 | Thornton |
| 6,043,809 A | 3/2000 | Holehan |
| 6,459,424 B1 * | 10/2002 | Resman ........................ 345/173 |
| 6,806,815 B1 | 10/2004 | Kaikuranta et al. |
| D502,703 S | 3/2005 | Tsujimoto |
| 6,927,384 B2 * | 8/2005 | Reime et al. .................. 250/221 |
| 7,034,232 B2 | 4/2006 | Ide et al. |
| 7,053,799 B2 | 5/2006 | Yu et al. |
| 7,151,528 B2 | 12/2006 | Taylor |
| 7,495,659 B2 * | 2/2009 | Marriott et al. ............... 345/173 |
| 2002/0000977 A1 * | 1/2002 | Vranish ........................ 345/173 |
| 2002/0005824 A1 | 1/2002 | Oshitani et al. |
| 2002/0158838 A1 * | 10/2002 | Smith et al. .................. 345/156 |
| 2003/0034439 A1 | 2/2003 | Reime et al. |
| 2003/0043174 A1 * | 3/2003 | Hinckley ............ G06F 3/03547 345/684 |
| 2003/0048262 A1 * | 3/2003 | Wu et al. ....................... 345/173 |
| 2003/0095095 A1 | 5/2003 | Pihlaja |
| 2003/0142081 A1 | 7/2003 | Lizuka et al. |
| 2003/0146905 A1 * | 8/2003 | Pihlaja .......................... 345/173 |
| 2004/0004602 A1 | 1/2004 | Cheng et al. |
| 2004/0017355 A1 * | 1/2004 | Shim .................. G06F 3/03547 345/157 |
| 2004/0057769 A1 | 3/2004 | Ward et al. |
| 2004/0150630 A1 | 8/2004 | Hinckley |
| 2004/0257341 A1 * | 12/2004 | Bear ..................... G06F 1/1632 345/157 |
| 2005/0012723 A1 * | 1/2005 | Pallakoff ....................... 345/173 |
| 2005/0070349 A1 | 3/2005 | Kimura |
| 2005/0134576 A1 | 6/2005 | Lin |
| 2005/0140653 A1 | 6/2005 | Pletikosa ............. G06F 3/0338 345/168 |
| 2005/0168441 A1 * | 8/2005 | Obitsu et al. .................. 345/157 |
| 2005/0248542 A1 * | 11/2005 | Sawanobori ................. 345/173 |
| 2005/0253816 A1 * | 11/2005 | Himberg et al. ............. 345/173 |
| 2006/0001652 A1 * | 1/2006 | Chiu et al. .................... 345/173 |
| 2006/0063569 A1 | 3/2006 | Jacobs et al. |
| 2006/0097993 A1 * | 5/2006 | Hietala et al. ................ 345/173 |
| 2006/0287015 A1 | 12/2006 | Dunko |
| 2006/0293093 A1 | 12/2006 | Marcus |
| 2007/0008239 A1 | 1/2007 | Stroupe et al. |
| 2007/0046637 A1 | 3/2007 | Choo et al. |
| 2007/0046646 A1 | 3/2007 | Kwon et al. |
| 2007/0103453 A1 | 5/2007 | Choo et al. |
| 2007/0105604 A1 | 5/2007 | Choo et al. |
| 2008/0129685 A1 * | 6/2008 | Bertolus et al. .............. 345/156 |
| 2009/0128498 A1 * | 5/2009 | Hollemans et al. .......... 345/173 |

* cited by examiner

MOBILE COMMUNICATIONS TERMINAL HAVING A TOUCH INPUT UNIT AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application Nos. 20-2005-0024369 filed Aug. 24, 2005, 10-2005-100547, filed Oct. 25, 2005, and 10-2005-136199, filed Dec. 30, 2005, the contents of which are hereby incorporated by reference herein in their entirety.

BACKGROUND OF THE INVENTION

1. Field of the Invention

The present invention relates to mobile terminals, and in particular to a touch sensitive input unit for controlling a display associated with the mobile terminal.

2. Discussion of the Related Art

Generally, wireless data communications enable a user to send and receive various types of data such as text, video, and audio, via a portable communications terminal and a base station. Common terminals include, for example, mobile phones, portable computers, facsimile machines, credit card readers, and other communication devices. Recent advances in digital technology have increased the number of features available on such terminals.

Many terminals include a key panel or keyboard to control assorted functions and features offered by the terminal. One drawback of traditional terminals is that their associated key panels, for example, are exposed and susceptible to damage. Moreover, such key panels require a certain level of effort to manipulate the keys during operation. Still further, these key panels and keyboards are primarily functional providing very little to enhance the aesthetic appeal of the terminal.

Some terminals include a touch screen in an attempt to obviate some of the deficiencies of key panels and keyboards. Some touch screens require user input via a stylus pen or direct touch from a user. A stylus pen may not always be convenient to carry, and input via a user's finger does not always provide the desired level of accuracy due to the relatively large touching surface of a finger as compared to the size of a terminal screen.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method and apparatus for scrolling a display includes detecting contact relative to a touch pad having a plurality of regions which individually correspond to a plurality of different scrolling directions, and determining in which region of the plurality of regions the contact is detected. If the contact is maintained for a first threshold time period, the method further includes scrolling an associated display in a direction corresponding to the previously determined region.

According to one feature, after the first threshold time period has occurred, the method further includes terminating the scrolling operation after a second threshold time period has elapsed.

According to another feature, if the contact is maintained for a second threshold time period, the method further includes terminating the scrolling operation.

According to yet another feature, the method further includes determining if the detected contact is maintained for the first threshold time period.

According to still yet another feature, the method further includes detecting simultaneous contact relative to the touch pad at a plurality of different regions, such that if the simultaneous contact is continuously maintained for a second threshold time period, the method further includes terminating any scrolling resulting from the scrolling operation.

In accordance with an alternative embodiment, a method for scrolling a display includes receiving input responsive to contact relative to a plurality of touch pads individually associated with one of a plurality of different scrolling directions, and scrolling an associated display in a direction corresponding to a scrolling direction associated with a last-contacted touch pad.

In accordance with yet another embodiment, a method for scrolling a display includes receiving input within a first threshold period of time responsive to contact relative to a plurality of touch pads, determining a general direction of travel of the contact, associating the general direction of travel with one of a plurality of different scrolling directions to determine a scrolling parameter, and scrolling an associated display in a direction according to the scrolling parameter.

In accordance with still yet another embodiment, a method for scrolling a display includes receiving input responsive to contact relative to a plurality of regions of a touch pad, in which each of the plurality of regions individually correspond to a plurality of different scrolling directions, and scrolling an associated display in a direction corresponding to a scrolling direction associated with a last-contacted region of the plurality of regions.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 1:
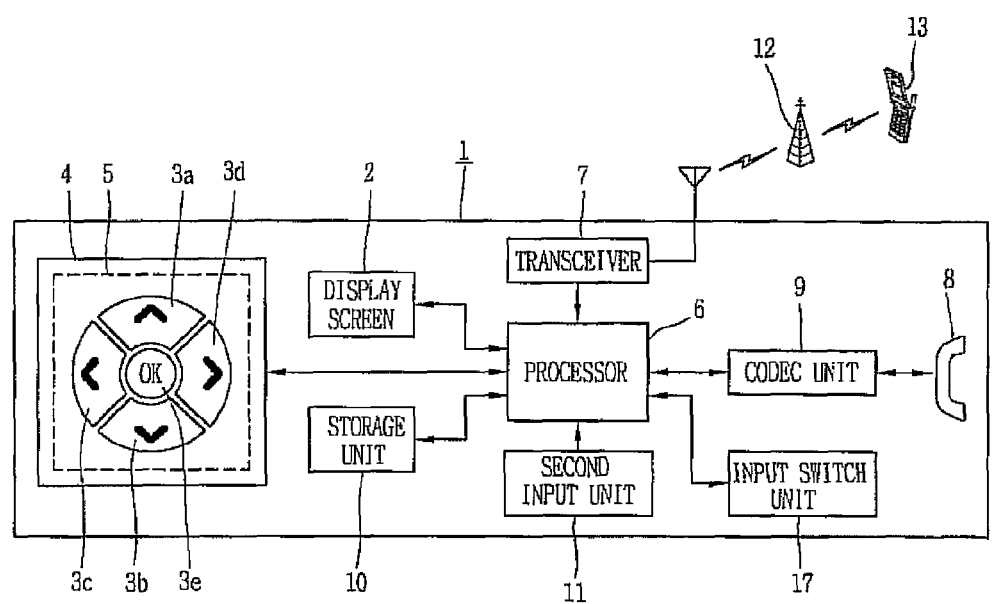
FIG. 1 depicts an exemplary mobile communications terminal in accordance with an embodiment of the present invention.

FIG. 1 depicts an exemplary mobile communications terminal in accordance with an embodiment of the present invention. As shown, mobile communications terminal 1 includes display screen 2 for displaying information and first input unit 4. The first input unit is shown having surface touch keys 3a-3d configured to receive contact from a user (e.g., user finger). A function touch key (OK) 3e is shown located at a central location relative to the other touch keys.

Touch sensitive sensor 5 may be arranged below a bottom surface of first input unit 4, and is typically configured to generate a touch signal responsive to contact relative to sensor 5 (e.g., contact with the touch keys of first input unit 4). Sensor 5 may be implemented using, for example, a touch pad.

Figure 2:
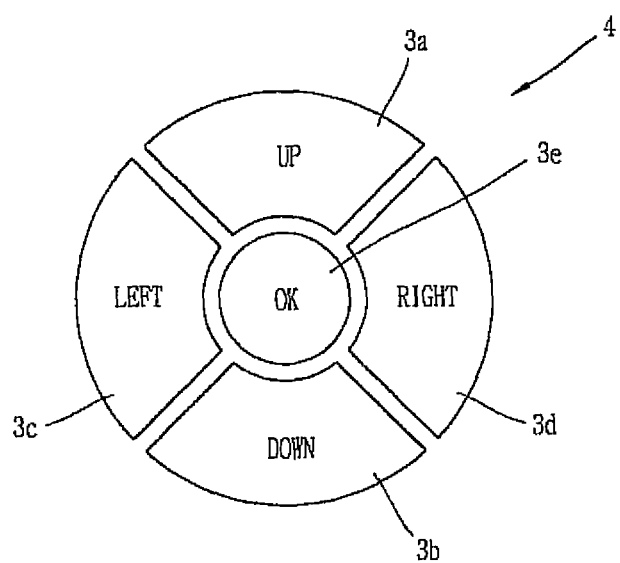
FIG. 2 is a detailed view of the first input unit of FIG. 1 implemented as a navigational input unit.

First input unit 4 and included sensor 5 may be configured to respond to a capacitance or resistance change caused by the user touching the first input unit. Different types of surface hardness (e.g. soft or hard), different surface smoothness, and different sensor technologies can be employed to form first input unit 4. FIG. 2 is a detailed view of first input unit 4 implemented as a navigational input unit.

First input unit 4 and sensor 5 may additionally or alternatively be configured to form a touch pad strip at one or more locations of terminal 1, including an edge of the display screen, a sidewall surface of the body adjacent the display screen, a top wall surface and a bottom wall surface of the body forming the terminal.

Processor 6 may be used to control screen navigation and scrolling functions of display 2 by moving a display screen image in a desired direction (e.g., upward, downward, leftward, rightward), and may also be used to control functions of terminal 1.

Terminal 1 may also include transceiver 7 for processing wireless signals, codec unit 9 for converting an analog signal received from a microphone of input/output unit 8 to a digital signal, and converting a digital signal to an analog signal for output via a speaker of input/output unit 8. Storage unit 10 may be used for storing information necessary or desired to support operation of terminal 1.

Second input unit 11 can be configured in a manner similar to that of first input unit 4, or input unit 11 may be implemented using a conventional press-button type key. Input switch unit 17 may be implemented to allow a user to select either or both of the first and second input units 4 and 11 as an active or operational input unit. Input switch unit 17 may include a default value which defines a certain input unit or units as an active component. This default may be modifiable by the user. Switching between input inputs may be accomplished in hardware, software, or combinations thereof. Terminal 1 is shown in a typically environment in which terminal 1 is in wireless communication with terminal 13 via base station 12.

Various embodiments will be described in the context of a mobile terminal. However, the present invention is not so limited and such teachings apply equally to other devices and systems including portable computers, personal digital assistants (PDAs), audio and video players, ultra portable mobile computers, and the like.

Figure 3:
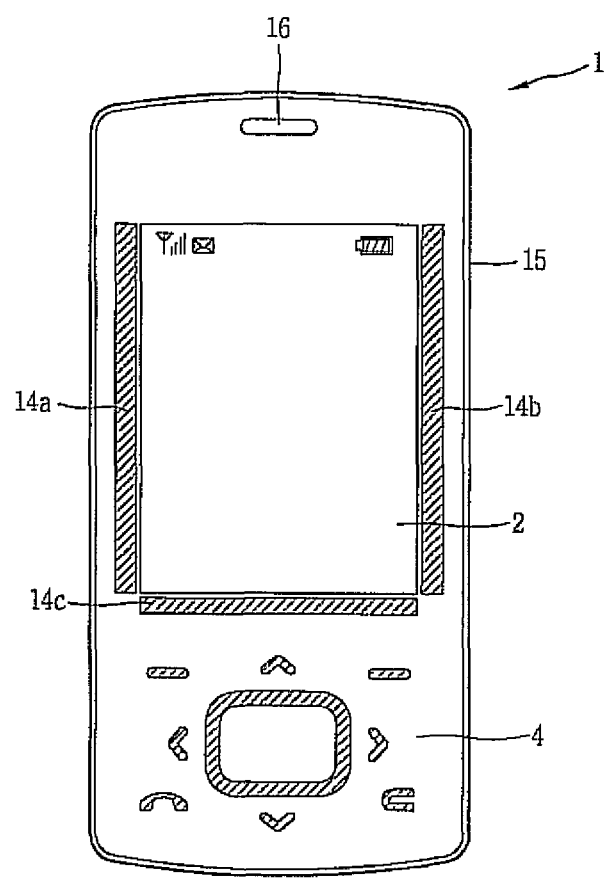
FIG. 3 is a top view of a mobile communications terminal according to an embodiment of the present invention.

FIG. 3 is a top view of a mobile communications terminal according to an embodiment of the present invention. In this figure, terminal 1 includes display 2 positioned relative to a front surface of main housing 15, and speaker 16 providing audio output. In this example, first input unit 4 of FIG. 1 is implemented using vertical touch pad strips 14a, 14b, which are individually located in a vertical orientation relative to either side of display 2. First input unit 4 also includes horizontal touch pad strip 14c, which is located along a bottom edge of display 2, near navigation touch pad 4.

Vertical touch pad strips 14a, 14b may be used to detect upward or downward sliding contact. Signals generated by the vertical touch pad strips may be used to control items displayed on display 2. For example, upward or downward sliding contact with either of vertical touch pad strips 14a, 14b permits vertical scrolling of display 2. Downwardly sliding a finger along touch pad strip 14a causes a corresponding downward scrolling of the display (i.e., displayed items move upward thus displaying at the bottom of the display previously hidden items). Upward scrolling occurs in the opposite manner such that upwardly sliding a finger along touch pad strip 14a causes a corresponding upward scrolling of the display (i.e., displayed items move downward thus displaying at the top of the display previously hidden items).

Horizontal touch pad strip 14c operates in a similar manner to provide horizontal scrolling for display 2. Sliding a finger in a leftward direction causes a corresponding leftward scrolling of the display, while sliding a finger in a rightward direction causes a corresponding rightward scrolling of the display.

Touch pad strips 14a-14c may additionally or alternatively be configured to detect non-sliding contact at various locations along the touch pad strips. In such an embodiment, contact with the vertical and horizontal touch pad strips may be used to provide, for example, scrolling for screen 2. For instance, a user may contact vertical contact touch pad strip 14a (or strip 14b) at a particular location to specify a Y-axis value with regard to screen 2. Simultaneously or subsequently to this contact, the user can also contact horizontal touch pad strip 14c at a particular location to specify an X-axis value with regard to screen 2. No particular order for contacting the various touch pad strips 14a-14c is necessary.

The X-axis and Y-axis values may be used to specify a particular location on screen 2. This information may be used in a scrolling operation in which the display is scrolled so that the screen items located at the location identified by the X-axis and Y-axis values is centered or otherwise positioned at a particular location on the screen. Another use of these values is to trigger a "select" operation such that a screen item present at the particular location on the screen, as defined by the X-axis and Y-axis values, will be "selected" or otherwise identified.

In a related scrolling operation, contact with touch pad strips 14a-14c may be used to control relative positioning of a screen item. An example of an application using this type of scrolling is one in which a game is being played on mobile terminal 1. Vertical directional input may be accomplished by contact with either or both of touch pad strips 14a, 14b, and horizontal directional input may be accomplished by contact with touch pad strip 14c.

Figure 4:
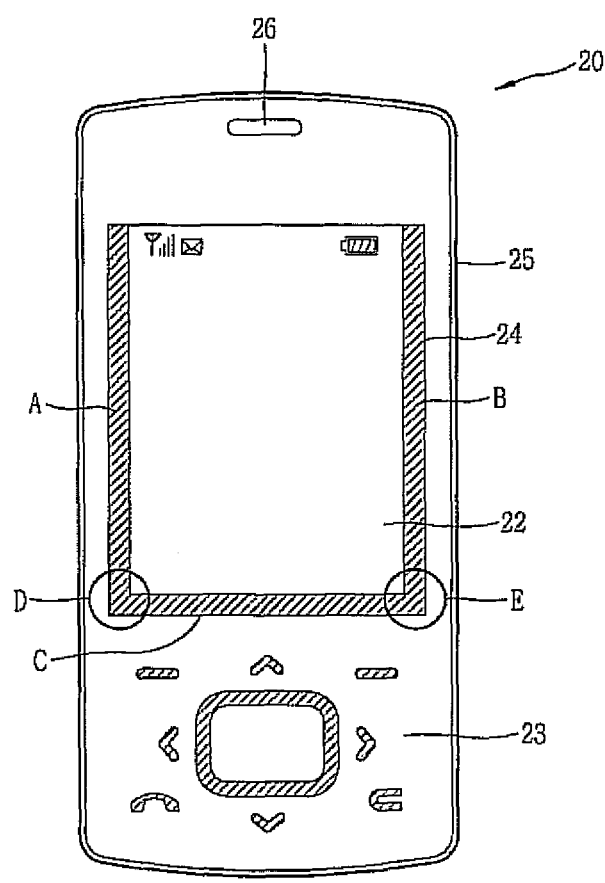
FIG. 4 is a top view of a mobile communications terminal according to another embodiment of the present invention.

FIG. 4 is a top view of a mobile communications terminal according to another embodiment of the present invention. In this figure, terminal 20 includes display 22 positioned relative to a front surface of main housing 25, and speaker 26 providing audio output. In this example, first input unit 4 of FIG. 1 is implemented using an integrated touch pad strip 24, which is located relative to three of the four sides of display 2, and navigation touch pad 23.

Touch pad strip 24 includes three regions, A, B, and C, which individually operate in a manner similar to touch pad strips 14a-14c (FIG. 3). For instance, vertical regions A and B of touch pad strip 24 may operate in a manner similar to vertical touch pad strips 14a, 14b (FIG. 3), and region C of touch pad strip 24 may operate in a manner similar to horizontal touch pad strip 14c.

Touch pad strip 24 is further shown having regions D and E, which individually provide scrolling of display 24 in both horizontal and vertical directions. For instance, contact at region D may cause downward and leftward scrolling of screen 24, while contact at region E may cause upward and rightward scrolling of the screen.

An alternative is to switch the vertical directions such that contact at region D causes upward and leftward scrolling, while contact at region E causes downward and rightward scrolling. This embodiment is not limited to the stated examples, and each of regions D and E may therefore be associated with any horizontal direction and any vertical direction. Although operation of this embodiment is made with regard to scrolling display 24, such teachings apply equally to control in the relative positioning of a screen item displayed on display 24.

Figure 5:
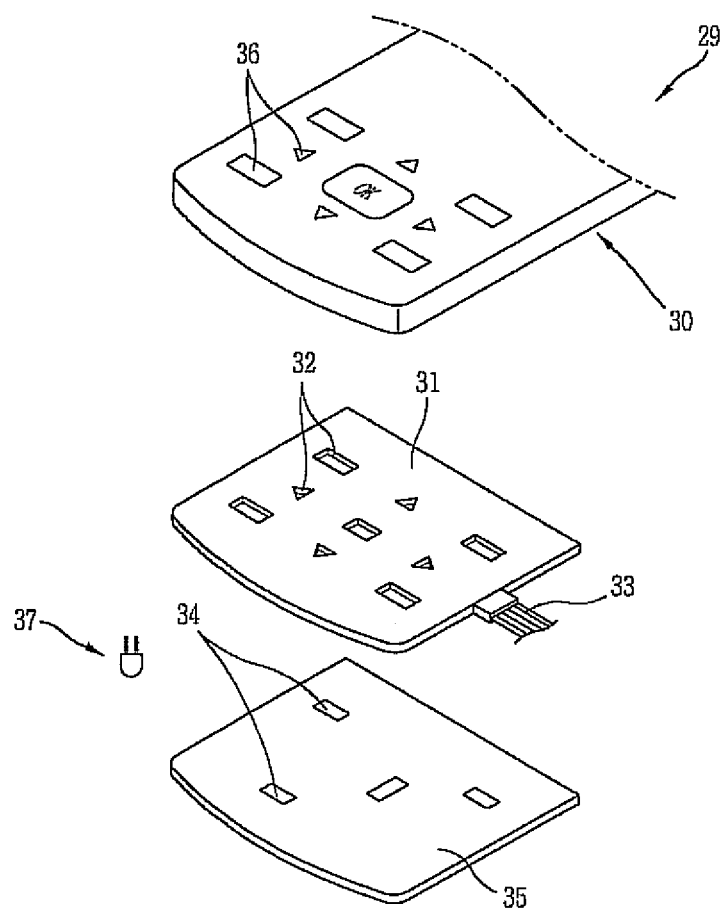
FIG. 5 is perspective view showing portions of a disassembled touch key assembly.

FIG. 5 is perspective view showing portions of disassembled touch key assembly 29. Some or all of the components of assembly 29 may be used to implement any of the navigation touch pads disclosed herein.

Touch key assembly 29 is shown with touch pad 31, which is structured to operatively couple to body 30. The body may be implemented as a cover or housing. Assembly 29 may further include optional optical waveguide 35. One or more light sources 37 may be positioned relative to the bottom side of touch pad 31. If desired, the light sources may be directly coupled to the touch pad. The depicted light source is shown detached from touch pad 31 for clarity.

In an embodiment, some or all of body 30 may be formed from a transparent or semitransparent material. It is desirable for such material to be sufficiently rigid to serve has a housing for a mobile terminal, for example. Touch keys 36 may be configured such that they are each defined by an optically transmissive region surrounded by regions which do not transmit light. The touch keys may be integrated with body 30 (e.g., the cover), or these elements may be discrete components. The touch keys may be structured to define alphanumeric keys, numeric keys, and various shapes and symbols.

One technique for forming touch keys 36 is to introduce an opaque material, such as ink, over certain portions of the body. Touch keys 36 may be defined as areas of the body which do not include opaque material. Incident light will be transmitted by optically transmissive regions of the body, and will not be transmitted by the portions of the body which include the opaque material. Various types, shapes, and numbers of touch keys may therefore be formed using this technique.

Touch pad 31 may be implemented using conventional touch pad technologies which are capable of detecting user manipulation or other contact with an associated touch key 36. During use, the touch pad generates signals which may be communicated to processor 6 via flexible printed circuit board (FPCB) 33, for example. Touch pad 31 may be coupled or otherwise placed in close physical relationship to the bottom side of body 30 using known techniques (e.g., adhesive, tape, and the like). Suitable touch pads include, for example, pressure-sensitive touch pads, capacitance touch pads, and the like.

Touch pad 31 may also include one or more strategically located light guides 32. As shown, each light guide 32 is associated with an individual touch key 36. As an example, the touch pad may be shaped to define an aperture which forms an individual light guide. Light guides 32 are often implemented to permit light provided by light sources 37 to pass through touch pad 31, and consequently, optically transmissive touch keys 36. If desired, optically transmissive material may be formed within some or all of the light guides. This feature enhances the structural integrity of the touch pad.

Light sources 37 may be implemented using known devices and structures which can provide light at the wavelength of interest to one or more touch keys 36. Typical light sources include light emitting diodes (LEDs) and vertical surface emitting lasers (VCSELs), among others. The light sources may receive the necessary power via FPCB 33, which is associated with touch pad 31.

It is notable that light emitted by light sources 37 is not unnecessarily hindered by structures, which is common in conventional assemblies. More specifically, light emitted by light sources 37 reaches touch keys 36 relatively unimpeded. This reduces the number of needed light sources, which consequently reduces the power requirements of the assembly.

Although possible, it is not necessary for each touch key 36 to have an associated light source 37. In general, the number of light sources is fewer than the number of touch keys. In some implementations, a single light source provides sufficient light to all touch keys. Maximum light to the touch keys may be achieved by positioning each light source relatively close to an associated light guide 32.

Optical waveguide 35, which is an optional component, is shown positionable relative to the bottom side of touch pad 31. The waveguide may be formed from a suitable material (e.g., glass or plastic) which transmits light at the wavelength of interest. If desired, optical waveguide 35 may be coupled to the bottom side of touch pad 31 using known techniques (e.g., adhesive, tape, and the like). It is not a requirement that the waveguide actually contact touch pad 31. As an alternative, these components may be placed in close physical relationship, but not actually contacting each other.

Optical waveguide 35 may further include one or more additional features. For instance, the waveguide may include a separate recess 34 individually associated with each of the light sources 37. Each recess may be formed in a top surface of the optical waveguide, and is typically sized to receive at least a portion of an associated one of the light sources. The recesses permit a relatively tight coupling between waveguide 35 and touch pad 31, thereby reducing the need for a gap between these components. Since no gap is needed to allow for clearance for the light sources, the overall thickness of the assembly may be reduced.

If desired, a reflection element (not shown) may be operatively associated with the bottom side of optical waveguide 35. The reflection element may be implemented using material which is structured to reflect light from light sources 37. Possible materials for the reflection element include a reflection sheet formed as a thin metal plate, resin coated with gold foil, or paper.

Operation of a mobile terminal implementing touch key assembly 29 may proceed as follows. After the mobile terminal is activated, light is emitted by light sources 37 and travels through optical waveguide 35. The light propagates through light guides 32 and corresponding touch keys 36. This lighting function may be continuously employed, or activated only during periods of reduced lighting conditions as controlled by, for example, a manual switch or via a light sensor (not shown).

Figure 6:
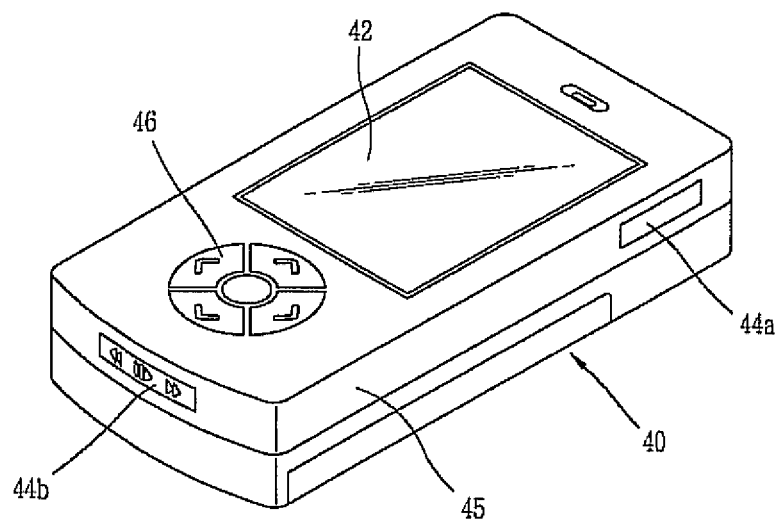
FIG. 6 is a perspective view of a mobile communications terminal according to another embodiment of the present invention.

FIG. 6 is a perspective view of a mobile communications terminal according to another embodiment of the present invention. In this figure, terminal 40 includes display 42 positioned within housing 45. The terminal may further include one or more touch pad strips. The example of FIG. 6 shows touch pad strip 44a located along the right side of housing 45. The left side of the housing may additionally or alternatively include a touch pad strip. Touch pad strip 44b is located along a side of housing 45, near navigation touch pad 46. Touch pad strips 44a and 44b may each be configured to operate in a manner similar to the various vertical and horizontal touch pad strips previously described.

In addition, each of these touch pad strips may include multiple function keys that allow the user to perform a certain function. For instance, the function keys can be assigned for a multimedia playback or other functions useful for operating the terminal.

Figure 7:
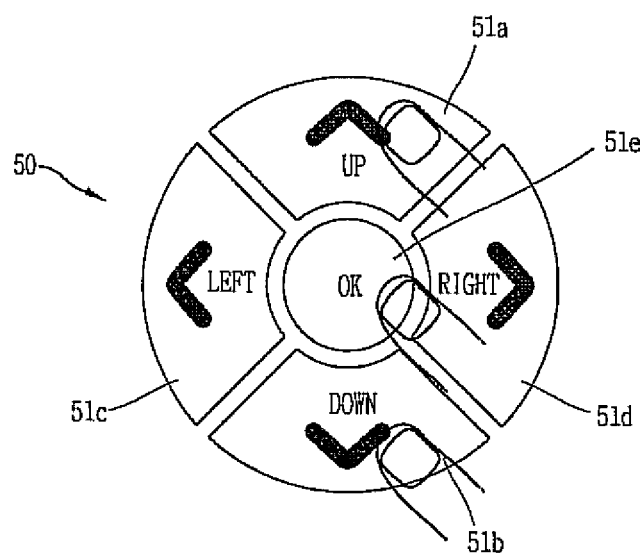
FIG. 7 depicts a navigation touch pad in accordance with an embodiment of the present invention.

FIG. 7 depicts a navigation touch pad in accordance with an embodiment of the present invention. Any of the navigation touch pads disclosed herein may be configured to operate in the manner that will now be described. By way of nonlimiting example only, navigation touch pad 50 will be described in conjunction with various components of the terminal depicted in FIG. 1.

Navigation touch pad 50 includes five separate directional keys of UP, DOWN, LEFT, and RIGHT (51a-51d), and one function (OK) key 51e. As with other navigation touch pads disclosed herein, touch pad 50 may be formed from one or more separate touch pads. For instance, direction keys 51a-51d and function key 51e may each include a single touch pad. Alternatively, a single touch pad may include a plurality of regions which individually correspond to each of these keys (51a-51e).

Operation of touch pad 50 may proceed as follows. When the user contacts a direction key to perform a screen scrolling function, for example, processor 6 may detect this contact. A user may drag or otherwise slide a finger, stylus, or other object from a first direction key to another direction key in either a horizontal or vertical direction. Such motion will typically result in contact with middle function key 51e. As a result of this sliding motion, processor 6 may cause a screen image displayed on display 2 to move in a direction that is opposite to that direction that is associated with the first-contacted direction key.

For example, if a user contacts UP touch key 51a, processor 6 stores the position of the UP direction key 51a, determines whether contact is maintained on UP direction key 51a for a predetermined time period (e.g. 30-40 milliseconds), and deletes such position data if the contact is not maintained for this time period. Consider the situation in which the user slideably contacts touch pad 50 in a downward fashion such that keys 51a, 51e, and 51b are contacted in succession.

If contact had been maintained on UP direction key 51a for the requisite time period, processor 6 may detect this sliding movement and store information indicating that contact with the middle key and the DOWN direction key has been detected. This action may be used by the mobile terminal to provide, for example, a scrolling operation for display 2 or to provide movement of a screen image on the display in a particular direction (e.g., downward). Repeated contact with the identified keys in a downward direction may be used to repeatedly scroll the display or move the screen image.

This scrolling or screen image moving technique applies equally to the other directions of the navigation touch pad. For instance, one scenario is where contact is first made with DOWN direction key 51b, held for a predetermined time period, and then slid upwards contacting keys 51e and 51a in succession. This action may be used to provide, for example, a scrolling operation or movement of a screen image on the display in a particular direction (e.g., upward). Sliding contact with touch pad 50 is the leftward and rightward direction will provide similar results such that scrolling or moving screen images in the leftward or rightward directions may be achieved.

This action may be used by the mobile terminal to provide, for example, a scrolling operation for display 2 or to provide movement of a screen image on the display in a particular direction (e.g., downward). Repeated contact with the identified keys in a downward direction may be used to repeatedly scroll the display or move the screen image.

Various embodiments have been described, but further alternatives are possible. For instance, the various touch pads and touch pad strips disclosed herein may be provided with audio and/or tactile feedback to notify the user of contact with such components. In addition, processor 6 may be configured to control scrolling speed and/or click speed of a finger touch stroke, and to provide user feedback in an audible, visual and/or tactile manner.

Still further, the mobile terminal may include a locking feature to protect the various touch pads and touch pad strips from inadvertent contact. For example, the mobile terminal may be configured to detect contact with the touch pad which exceeds a predetermined time period (e.g., 10-20 seconds). Contact for this time period often occurs when the mobile terminal is stored in a pant pocket or a purse. No scrolling or other action is required as a result of this contact. Consequently, the mobile terminal will disregard such contact in order to optimize battery power consumption of the mobile terminal.

Some embodiments have been described with regard to providing scrolling or moving a screen image responsive to contact with a touch pad or touch pad strip. However, such use is merely exemplary and such devices may be used to control or interact with most any function associated with the device or system implementing such devices.

Figure 8:
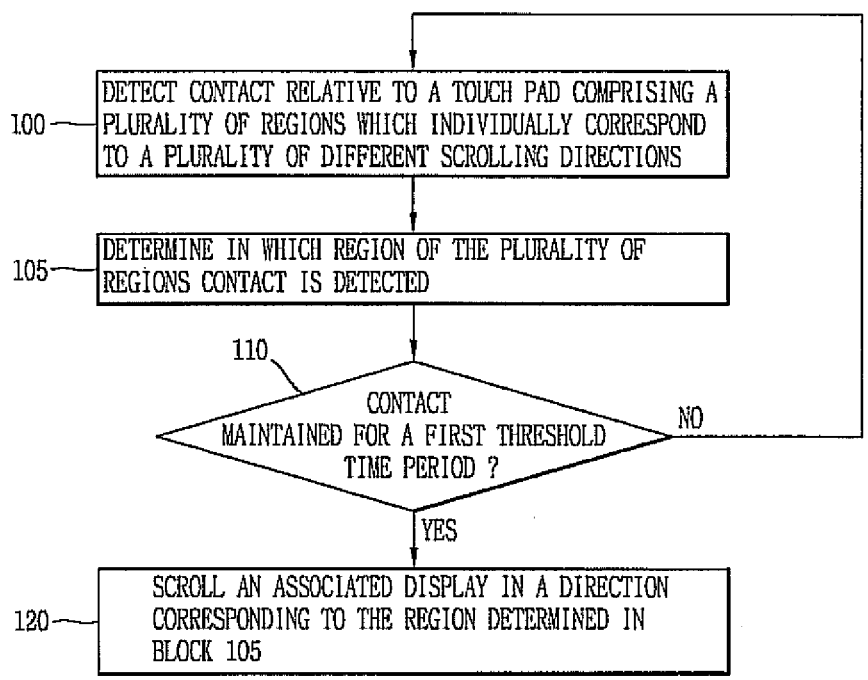
FIG. 8 is a flowchart depicting a method for scrolling a display in accordance with an embodiment of the present invention.

Various scrolling methods will now be described with regard to scrolling a display of a mobile terminal, but such teachings apply equally to other devices and systems. FIG. 8 is a flowchart depicting a method for scrolling a display in accordance with an embodiment of the present invention. Block 100 provides detecting contact relative to a touch pad comprising a plurality of regions which individually correspond to a plurality of different scrolling directions. Block 105 includes determining in which region of the plurality of regions the contact of block 100 is detected. Decision block 110 provides that if this contact is maintained for a first threshold time period, control flows to block 120, which provides scrolling of an associated display in a direction corresponding to the region determined in block 105.

In addition to the above, after the first threshold time period has passed, the method may further include terminating the scrolling of block 120 after a second threshold time period has elapsed. Alternatively if the contact detected in block 100 is maintained for a third threshold time period, then the scrolling of block 120 may be terminated.

If desired, the method may further include detecting simultaneous contact relative to the touch pad at a plurality of different regions. If the simultaneous contact is continuously maintained for a fourth threshold time period, then any scrolling in block 120 is terminated.

Figure 9:
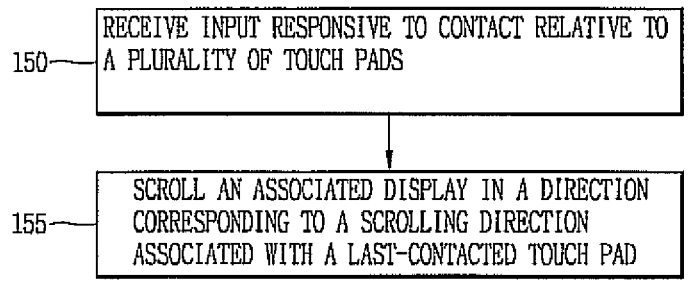
FIG. 9 is a flowchart depicting a method for scrolling a display in accordance with another embodiment of the present invention.

FIG. 9 is a flowchart depicting a method for scrolling a display in accordance with another embodiment of the present invention. Block 150 provides receiving input responsive to contact relative to a plurality of touch pads individually associated with one of a plurality of different scrolling directions. Block 155 provides scrolling an associated display in a direction corresponding to a scrolling direction associated with a last-contacted touch pad.

In general, each of the plurality of different scrolling directions is one of upwards, downwards, leftwards, and rightwards. If desired, block 155 is performed only if the plurality of touch pads for which input is received in block 150 have associated scrolling directions which are mutually opposing.

In some situations, input received via operation of block 150 results from contact relative to the plurality of touch pads which is simultaneous for at period of time. In other situations, such input results from discrete contact relative to each of the plurality of touch pads.

Figure 10:
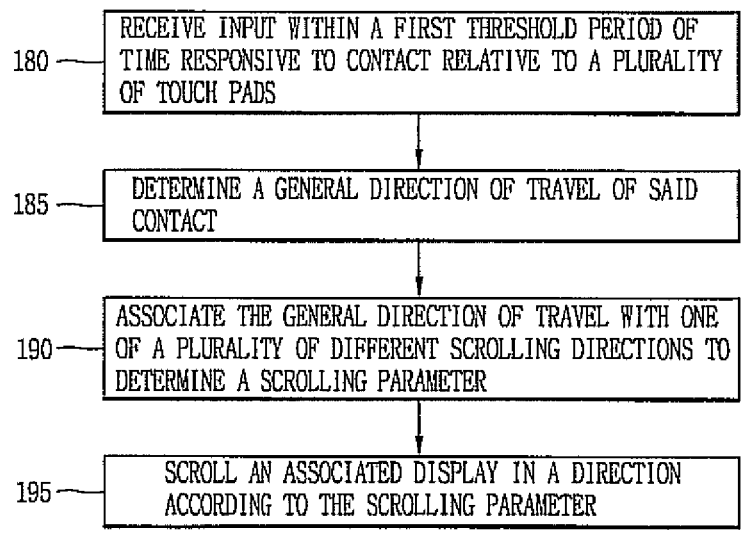
FIG. 10 is a flowchart depicting yet another method for scrolling a display in accordance with yet another embodiment of the present invention.

FIG. 10 is a flowchart depicting yet another method for scrolling a display. Block 180 includes receiving input within a first threshold period of time responsive to contact relative to a plurality of touch pads. Blocks 185 and 190 include determining a general direction of travel of the contact, and associating the general direction of travel with one of a plurality of different scrolling directions to determine a scrolling parameter. Block 195 depicts scrolling an associated display in a direction according to the scrolling parameter.

Figure 11:
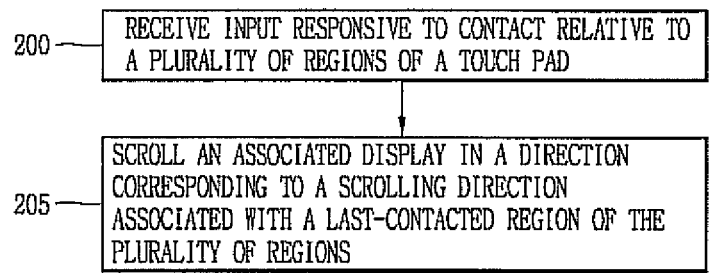
FIG. 11 is a flowchart depicting a method for scrolling a display in accordance with still yet another embodiment of the present invention.

FIG. 11 is a flowchart depicting a method for scrolling a display in accordance with another embodiment of the present invention. Block 200 includes receiving input responsive to contact relative to a plurality of regions of a touch pad. Typically, each of the plurality of regions individually correspond to a plurality of different scrolling directions. Block 205 provides scrolling an associated display in a direction corresponding to a scrolling direction associated with a last-contacted region of said plurality of regions.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal comprising:
   a display configured to display information;
   a plurality of touch pad strips configured to receive a touch input, wherein each of the plurality of touch pad strips is of an elongated shape;
   a processor configured to:
   detect the touch input when the mobile terminal is operating in an unlocked mode and disregard the touch input when the mobile terminal is operating in a locked mode; and
   perform an operation related to at least one object displayed on the display in response to the touch input when the mobile terminal is operating in the unlocked mode,
   wherein the plurality of touch pad strips are separated from the display such that the touch input can be received from a user without contacting the display,
   wherein each of the plurality of touch pad strips is proximate to the display and extends along different sides of the display, wherein a first touch pad strip among the plurality of touch pad strips extends vertically along one side of the display, and a second touch pad strip among the plurality of touch pad strips extends horizontally along another side of the display,
   wherein the first touch pad strip is different from the second touch pad strip and the one side of the display is different from the another side of the display,
   wherein the plurality of touch pad strips are situated on a surface of the mobile terminal where the display is located,
   wherein a length of the first touch pad strip is equal to or less than a length of the one side of the display, and a length of the second touch pad strip is equal to or less than a length of the another side of the display,
   wherein the processor is further configured to provide at least an audible, visual, or tactile feedback to the user when the touch input is detected,
   wherein the first touch pad strip and the second touch pad strip are coupled at a region on the surface of the mobile terminal, and
   wherein the processor is further configured to scroll the screen horizontally and vertically simultaneously in response to a touch input applied to the region.

2. The mobile terminal of claim 1, wherein the operation is at least an image scrolling operation, an image moving operation, a multimedia playback operation, a volume control operation, or an image zooming operation.

3. The mobile terminal of claim 1, wherein the touch input is either a sliding touch input or a non-sliding touch input.

4. The mobile terminal of claim 1, wherein each of the plurality of touch pad strips comprises a plurality of multimedia playback control keys.

5. The mobile terminal of claim 1, further comprising a plurality of navigation touch pads, wherein a first one of the plurality of navigation touch pads is configured as a function touch pad, and wherein at least a second one of the plurality of navigation touch pads corresponds to a direction.

6. A method for a mobile terminal, the method comprising:
   displaying information on a display;
   receiving a touch input via one of a plurality of touch pad strips, wherein each of the plurality of touch pad strips is of an elongated shape;
   detecting the touch input when the mobile terminal is operating in an unlocked mode and disregarding the touch input when the mobile terminal is operating in a locked mode; and
   performing an operation related to at least one object displayed on the display in response to the touch input when the mobile terminal is operating in the unlocked mode,
   wherein the plurality of touch pad strips are separated from the display such that the touch input can be received from a user without contacting the display,
   wherein each of the plurality of touch pad strips is proximate to the display and extends along different sides of the display, wherein a first touch pad strip among the plurality of touch pad strips extends vertically along one side of the display, and a second touch pad strip among the plurality of touch pad strips extends horizontally along another side of the display, wherein the first touch pad strip is different from the second touch pad strip and the one side of the display is different from the another side of the display, wherein the plurality of touch pad strips are situated on a surface of the mobile terminal where the display is located wherein a length of the first touch pad strip is equal to or less than a length of the one side of the display, and a length of the second touch pad strip is equal to or less than a length of the another side of the display, wherein at least an audible, visual, or tactile feedback is generated when the touch input is detected, wherein the first touch pad strip and the second touch pad strip are coupled at a region on the surface of the mobile terminal, and wherein the screen is scrolled horizontally and vertically simultaneously in response to a touch input applied to the region.

7. The method of claim 6, wherein the operation is at least an image scrolling operation, an image moving operation, a multimedia playback operation, a volume control operation, or an image zooming operation.

8. The method of claim 6, wherein the touch input is either a sliding touch input or a non-sliding touch input.

9. The method of claim 6, wherein each of the plurality of touch pad strips comprises a plurality of multimedia playback control keys.

10. The method of claim 6, further comprising a plurality of navigation touch pads, wherein a first one of the plurality of navigation touch pads is configured as a function touch pad, and wherein at least a second one of the plurality of navigation touch pads corresponds to a direction.

* * * * *